United States Patent [19]

Ebrahimi

[11] 3,723,760

[45] Mar. 27, 1973

[54] TRANSMISSION GATING CIRCUIT

[75] Inventor: Jalal Ebrahimi, Ottawa, Ontario, Canada

[73] Assignee: Bell Canada-Northern Electric Research Limited, Ottawa, Ontario, Canada

[22] Filed: Nov. 29, 1971

[21] Appl. No.: 202,999

[52] U.S. Cl. ..................307/203, 307/216, 307/231, 328/97

[51] Int. Cl. ............................................H03k 17/00

[58] Field of Search .........307/203, 216; 328/159, 90

[56] References Cited

UNITED STATES PATENTS 3,646,332 2/1972 Suzuki.................................307/216

*Primary Examiner*—Herman Karl Saalbach
*Assistant Examiner*—B. P. Davis
*Attorney*—John E. Mowle

[57] ABSTRACT

A transmission gating circuit for use in a digital multiplex system is disclosed. There is provided a comparator circuit comprising an exclusive-OR gate having a first input terminal connected to a source of serial binary input signal having an address portion and an information portion, a second input terminal connected to a pattern generator adapted to generate a signal which corresponds to a predetermined address, and an output terminal for obtaining a first output signal. An AND gating means is connected in series between the output terminal of the exclusive-OR gate and an output port for connection to a subscriber terminal. A gating circuit which includes a single memory unit is responsive to the first output signal and to first and second control signals for inhibiting the AND gating means during the address portion of the input signal and for allowing the AND gating means to pass the information portion of the input signal when the address portion of the input signal matches the address generated by the pattern generator.

4 Claims, 2 Drawing Figures

TRANSMISSION GATING CIRCUIT

This invention relates to multiplex systems generally, and more particularly to a transmission gating circuit which may be used in a digital multiplex system.

In a multiplex system, the usage of a transmission path is increased by having a plurality of users or subscribers connected to the same transmission path. Each of the subscribers is provided with a transmission gating circuit which allows it to receive only the information destined for it. In this type of system, a first subscriber wanting to communicate with a second subscriber sends out a composite signal on a transmission path common to the second subscriber. The composite signal is a serial binary signal having an address portion and an information portion. The second subscriber decodes the address portion OF the signal and accepts the information portion only if the address portion of the signal matches its own address.

The transmission gating circuit presently employed for decoding the address portion of the signal and for allowing the information portion of the signal to pass through to the subscriber usually comprises a comparator circuit and a gate controlled by the output signal from the comparator. The comparator circuit consists of a storage register which is loaded with the address portion of the input signal. A predetermined address of a subscriber is decoded by connecting an AND gating circuit to outputs of predetermined stages of the register.

However, the control circuitry for the transmission gating circuit just described is complex and the storage register is required to have a number of stages corresponding to the number of data bits in the address portion of the input signal. In a high capacity system, the storage register may be quite large. Furthermore, if it becomes desirable to expand the system, the storage register must also be enlarged. In view of the present component technology which promotes the use of integrated circuits and large and medium scale integration, this would probably entail replacing the comparator circuits with larger capacity circuits.

The transmission gating circuit of the invention overcomes the problems discussed above by using a single memory unit regardless of the length of the address portion of the input signal.

In accordance with my invention, there is provided a comparator circuit comprising an exclusive-OR gate having a first input terminal connected to a source of serial binary input signal having an address portion and an information portion, a second input terminal connected to a pattern generator adapted to generate a signal which corresponds to a predetermined address, and an output terminal for obtaining a first output signal. An AND gating means is connected in series between the output terminal of the exclusive-OR gate and an output port for connection to a subscriber terminal. A gating circuit which includes a single memory unit is responsive to the first output signal and to first and second control signals for inhibiting the AND gating means during the address portion of the input signal and for allowing the AND gating means to pass the information portion of the input signal when the address portion of the input signal matches the address generated by the pattern generator.

An example embodiment of the invention will now be described in conjunction with the drawings, in which.

Figure 1:
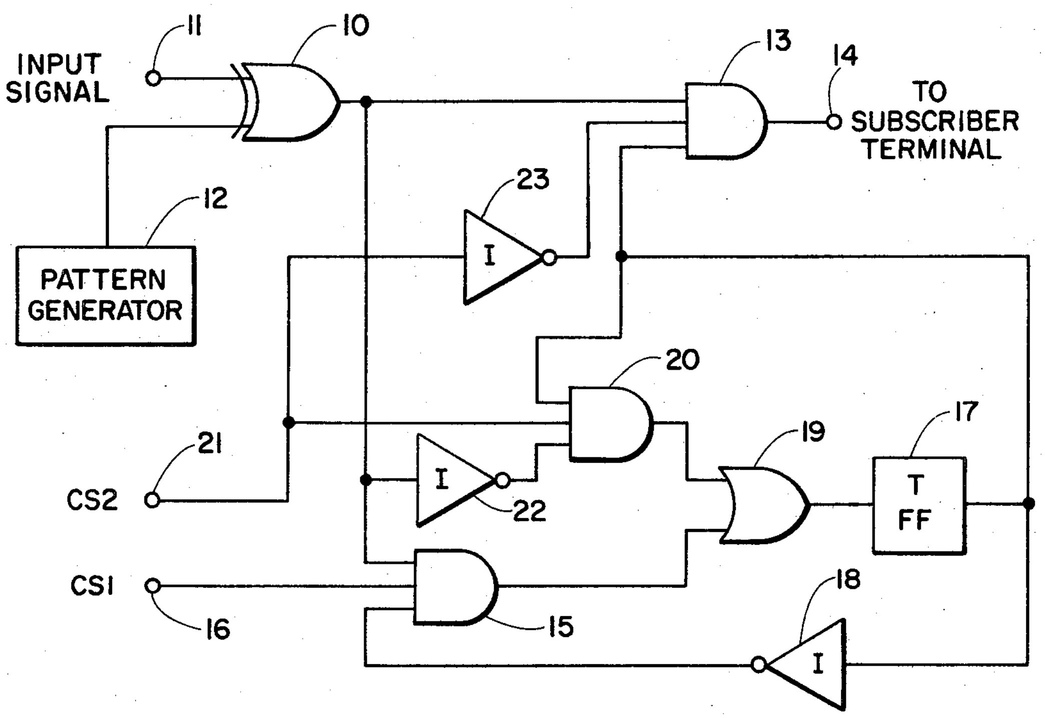
FIG. 1 is a transmission gating circuit in accordance with the invention.

FIG. 1 shows a comparator circuit comprising an exclusive-OR gate 10 having a first input terminal connected to an input port 11, and a second input terminal connected to a pattern generator 12. The generator 12 may be any generator, such as a Walsh-function generator, adapted to generate a signal which corresponds to a predetermined address. It should be appreciated that a complementary exclusive-OR gate may be used in place of exclusive-OR gate with suitable adjustment in the pattern generator output and the remainder of the circuit of FIG. 1.

A first AND gate 13 has a first input terminal connected to the output terminal of gate 10 and its output terminal connected to an output port 14. A second AND gate 15 has a first input terminal connected to the output terminal of gate 10, a second input terminal connected to a second input port 16, a third input terminal connected to the output of a triggerable flip-flop 17 through an inverter gate 18, and an output terminal connected to a first input terminal of an OR gate 19. As is generally known, the output signal of a triggerable flip-flop changes its level from high-to-low or low-to-high everytime that it is triggered.

A third AND gate 20 has a first input terminal connected to the output terminal of flip-flop 17, a second input terminal connected to an input port 21, a third input terminal connected to the output terminal of gate 10 through an inverter gate 22, and an output terminal connected to a second input terminal of gate 19. The output terminal of gate 19 is connected to the trigger input of flip-flop 17. The input port 21 is also connected to a second input terminal of gate 13 through an inverter gate 23. A third input terminal of gate 13 is connected to the output terminal of flip-flop 17. Of course, the functions provided by gates 13, 15, 18, 19, 20, 22 and 23 may be realized using any type of logic gates such as NAND or NOR gates.

Figure 2:
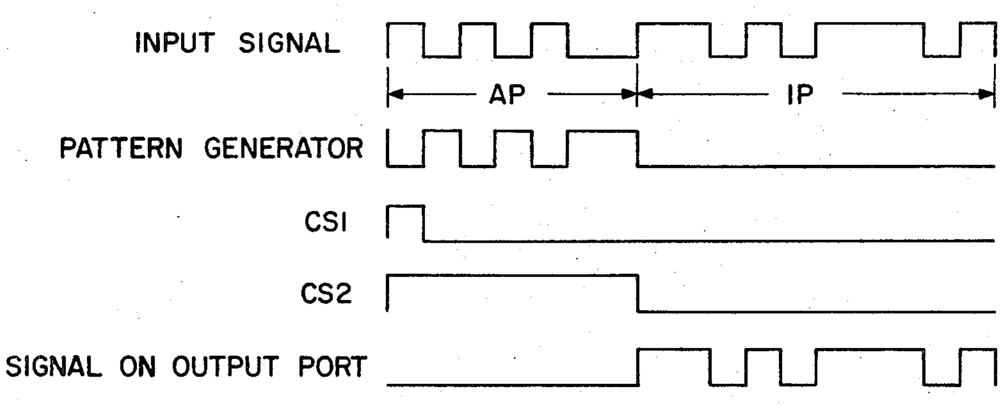
FIG. 2 shows a timing sequence for the operation of the circuit of FIG. 1.

The operation of the circuit of FIG. 1 may be described using the timing sequence of FIG. 2. The input signal appearing on input port 11 has an address portion (AP) and an information portion (TP). The signal appearing at the output of the pattern generator 12 is the true complement of the signal corresponding to the address of the subscriber which may be connected to output port 14. The first control signal (CS1) appearing on the second input port 16 is a data bit coincident with the first bit of the address portion of the input signal. The second control signal (CS2) appearing on the third input port 21 is of a width corresponding to that of the address portion of the input signal. In a multiplex system, control signals such as CS1 and CS2, are usually obtained from the central control unit of the system.

Let us assume that the subscriber connected to the output terminal 14 has an address corresponding to the address portion of the input signal shown in FIG. 2. In order for the subscriber to receive the information portion of the input signal, the pattern generator output signal must be the true complement of the address portion of the input signal. Under those conditions, the gate 10 produces the exclusive-OR function of these two signals to produce a match or high output signal.

On the first bit of the output signal, the output of gate 10 is high and this signal is applied to gate 15 to which is also applied control signal CS1 and the inverted output of flip-flop 17. Therefore, if the flip-flop output is low, gate 15 triggers the flip-flop 17 through gate 19 and the output level of the flip-flop 17 goes high. If the address portion of the input signal matches the signal from the generator 12, that is, if it is the true complement of the signal from the pattern generator 12, the flip-flop output level remains high throughout the duration of the input signal and together with the control signal CS2 allows gate 13 to pass the information portion of the input signal through to the subscriber. During the information portion of the input signal, the pattern generator 12 output level is low and the output signal at the output terminal of gate 10 follows the input signal. Gates 15, and 20 are inhibited by control signals CS1 and CS2.

If a mismatch occurs during the address portion of the input signal, the output signal on the output terminal of gate 10 is low which enables gate 20 through inverter gate 22 to trigger the flip-flop to a low output level through gate 19. The low output level of flip-flop 17 then inhibits gate 20 for the remainder of the address portion and inhibits gate 13 during the information portion of the input signal.

What is claimed is:

1. In a multiplex system, a transmission gating circuit for controlling access of a serial binary input signal to a selected subscriber terminal, the input signal having an address portion and an information portion, each portion comprising a plurality of data bits, said transmission gating circuit comprising:

a first input port for connection to a source of input signal and an output port for connection to the subscriber terminal, second and third input ports for connection to respective sources of first and second control signals, a comparator circuit comprising an exclusive-OR gate having a first input terminal connected to the first input port, a second input terminal connected to a pattern generator adapted to generate a signal which corresponds to a predetermined address, and an output terminal for obtaining a first output signal, a first AND gating means connected in series between the output terminal of the first exclusive-OR gate and the output port, a gating circuit including a single memory unit, said gating circuit being responsive to said first output signal and to said first and second control signals for inhibiting said first AND gating means during the address portion of the input signal and for allowing said first AND gating means to pass the information portion of the input signal when the address portion of the input signal matches the address generated by the pattern generator.

2. A transmission gating circuit as defined in claim 1 wherein said memory unit is a triggerable flip-flop and wherein the remainder of the gating circuit comprises:

a second AND gating means responsive to said first output signal and to said first control signal and to the complement of the output signal from the flip-flop for producing a second output signal, a third AND gating means responsive to the output signal from the flip-flop, to said second control signal and to the complement of said first output signal for producing a third output signal, an OR gating means responsive to said second and third output signals for triggering said flip-flop.

3. A transmission gating circuit as defined in claim 2 wherein said first AND gating means is an AND gate having an output terminal connected to the subscriber terminal, a first input terminal connected to the output terminal of the exclusive-OR gate, a second input terminal connected to the third input port through an inverter gate and a third input terminal connected to the output terminal of the flip-flop.

4. A transmission gate circuit as defined in claim 3 wherein said second and third AND gating means are AND gates and wherein said OR gating means is an OR gate.

* * * * *